US009802699B2

(12) United States Patent
Zamponi et al.

(10) Patent No.: US 9,802,699 B2
(45) Date of Patent: Oct. 31, 2017

(54) ADAPTIVELY-TWISTABLE BLADE, AND AN AIRCRAFT INCLUDING SUCH A BLADE

(71) Applicant: AIRBUS HELICOPTERS, Marignane (FR)

(72) Inventors: Laurent Zamponi, Vitrolles (FR); Nicolas Fontaine, Aix en Provence (FR); Valerian Durand, Drancy (FR); Jean-Francois Hirsch, Aix en Provence (FR); Boris Grohmann, Munich (DE)

(73) Assignee: Airbus Helicopters, Marignane (FR)

( * ) Notice: Subject to any disclaimer, the term of this patent is extended or adjusted under 35 U.S.C. 154(b) by 723 days.

(21) Appl. No.: 14/510,420

(22) Filed: Oct. 9, 2014

(65) Prior Publication Data

US 2015/0104314 A1  Apr. 16, 2015

(30) Foreign Application Priority Data

Oct. 11, 2013  (FR) ..................... 13 02363

(51) Int. Cl.
  *B64C 27/473*  (2006.01)
  *B64C 27/72*   (2006.01)
  *F01D 5/14*    (2006.01)

(52) U.S. Cl.
  CPC ............ *B64C 27/473* (2013.01); *B64C 27/72* (2013.01); *F01D 5/147* (2013.01); *B64C 2027/7222* (2013.01); *Y02T 50/34* (2013.01)

(58) Field of Classification Search
  CPC ..... F01D 5/147; B64C 27/72; B64C 27/7222; B64C 27/473
  See application file for complete search history.

(56) References Cited

U.S. PATENT DOCUMENTS

| | | |
|---|---|---|
| 4,111,605 A | 9/1978 | Roman et al. |
| 5,004,189 A | 4/1991 | Igram |
| | (Continued) | |

FOREIGN PATENT DOCUMENTS

| | | |
|---|---|---|
| DE | 19528155 | 6/1996 |
| FR | 2374212 | 7/1978 |
| | (Continued) | |

OTHER PUBLICATIONS

French Search Report for FR 1302363, Completed by the French Patent Office dated Jul. 9, 2014, 6 Pages.

*Primary Examiner* — Woody Lee, Jr.
(74) *Attorney, Agent, or Firm* — Brooks Kushman P.C.

(57) ABSTRACT

A blade (1) having an outer covering (2) defining a cavity (8). A carriage (20) is arranged in said cavity (8), the carriage (20) being provided with a torsion bar (21) and at least two arms (22) secured to the torsion bar (21). The blade has one connection per arm provided both with an upstream guide gallery and with a downstream guide gallery, each arm extending transversely from an upstream end that slides in an upstream guide gallery to a downstream end that slides in a downstream guide gallery. At least one connection is a helical connection (40) obtained with the help of an upstream guide gallery (33) and the downstream guide gallery (34) of the segment (101) presenting distinct orientations, giving rise to movement in rotation (ROT1) of the segment (101) under the effect of the carriage (20) moving in translation.

22 Claims, 6 Drawing Sheets

(56) References Cited

U.S. PATENT DOCUMENTS

| | | | |
|---|---|---|---|
| 5,288,039 A * | 2/1994 | DeLaurier | B64C 3/52 244/219 |
| 5,505,589 A | 4/1996 | Bergey | |
| 5,681,014 A * | 10/1997 | Palmer | B64C 3/52 244/134 A |
| 5,730,581 A | 3/1998 | Buter et al. | |
| 6,024,325 A * | 2/2000 | Carter, Jr. | B64C 27/46 244/17.25 |
| 7,037,076 B2 | 5/2006 | Jacot et al. | |
| 7,677,868 B2 | 3/2010 | Chaudhry et al. | |
| 7,717,373 B2 | 5/2010 | Jaenker | |
| 7,837,144 B2 | 11/2010 | Kothera et al. | |
| 8,162,607 B2 | 4/2012 | Grohmann et al. | |
| 8,205,840 B2 | 6/2012 | Mercier Des Rochettes et al. | |
| 8,821,128 B2 | 9/2014 | Bianchi et al. | |
| 2005/0236518 A1* | 10/2005 | Scott | B64C 27/10 244/17.23 |
| 2006/0002794 A1* | 1/2006 | Moroz | F03D 7/0228 416/48 |
| 2006/0038058 A1 | 2/2006 | Routery | |
| 2008/0145220 A1 | 6/2008 | Yeh et al. | |
| 2009/0212158 A1* | 8/2009 | Mabe | B64C 9/32 244/1 N |
| 2010/0308155 A1* | 12/2010 | Nakao | B64C 27/54 244/17.13 |
| 2012/0153073 A1 | 6/2012 | Groen | |
| 2013/0062456 A1 | 3/2013 | McCollough et al. | |
| 2013/0089422 A1* | 4/2013 | Brunken, Jr. | B64C 27/473 416/23 |
| 2015/0104314 A1* | 4/2015 | Zamponi | B64C 27/72 416/134 A |

FOREIGN PATENT DOCUMENTS

| | | |
|---|---|---|
| FR | 2737465 | 2/1997 |
| FR | 2924681 | 6/2009 |
| FR | 2956856 | 9/2011 |
| WO | 0037309 | 6/2000 |
| WO | 2004069651 | 8/2004 |
| WO | 2007079855 | 7/2007 |
| WO | 2009056136 | 5/2009 |
| WO | 2010023278 | 3/2010 |
| WO | 2010023286 | 3/2010 |
| WO | 2010043645 | 4/2010 |

* cited by examiner

A-A

B-B

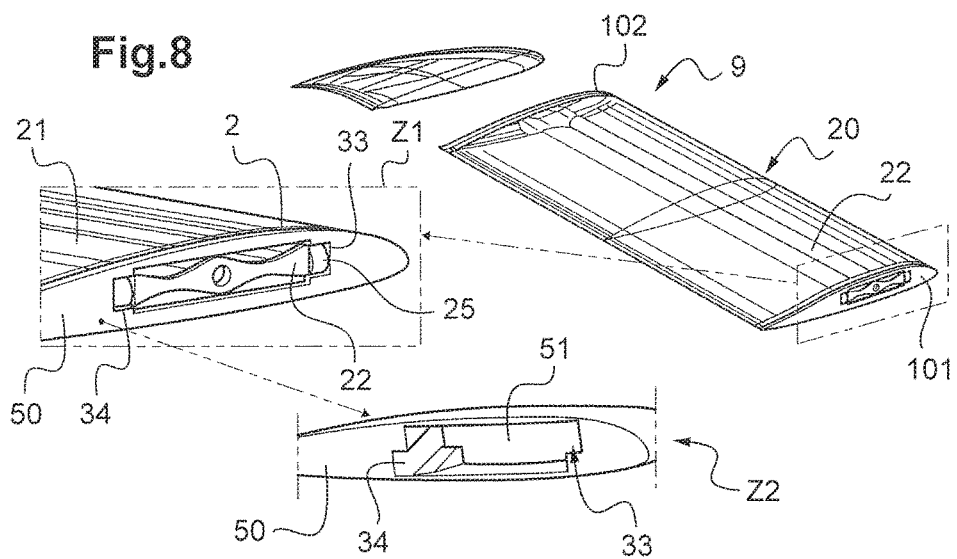
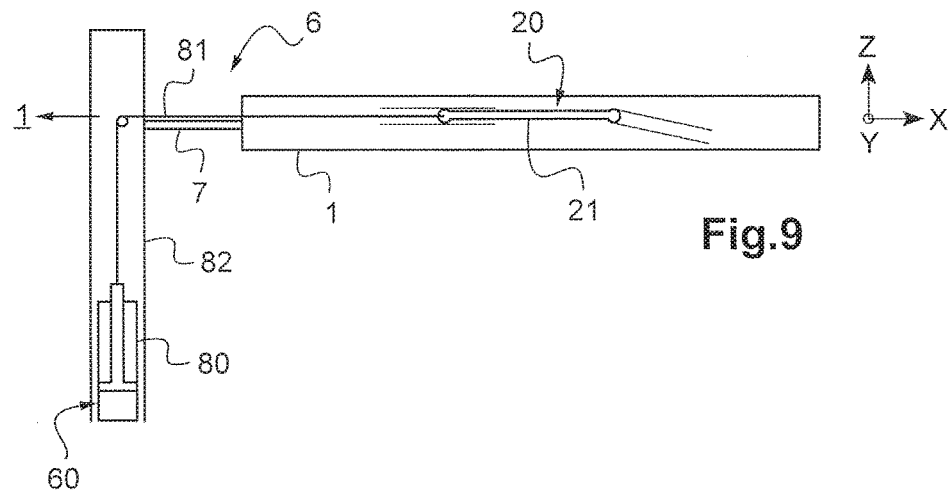
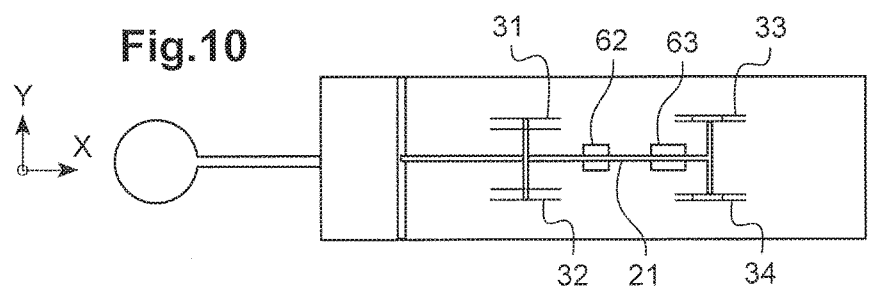

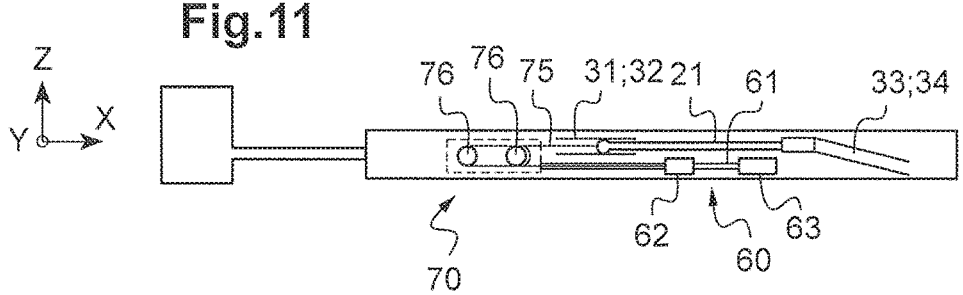
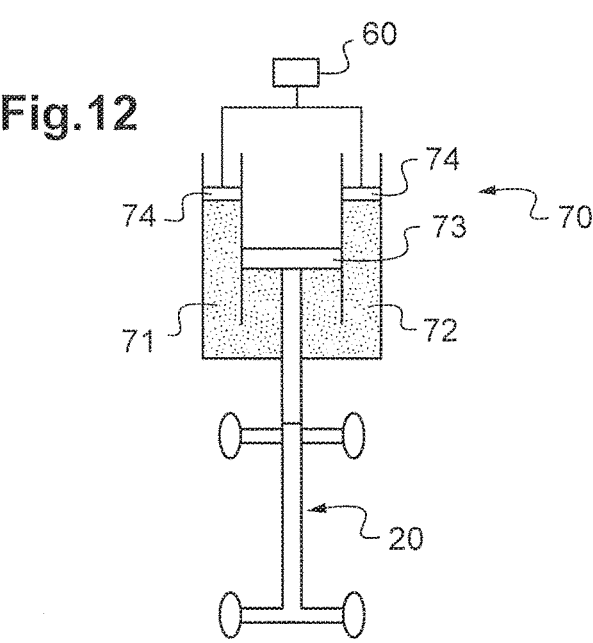
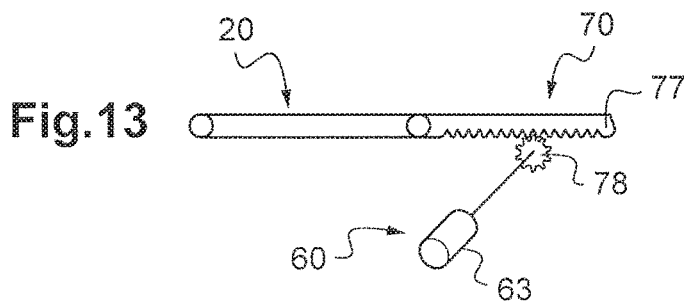
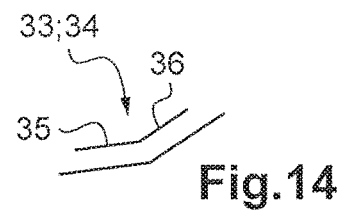
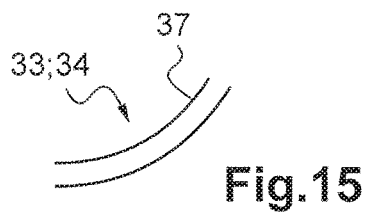

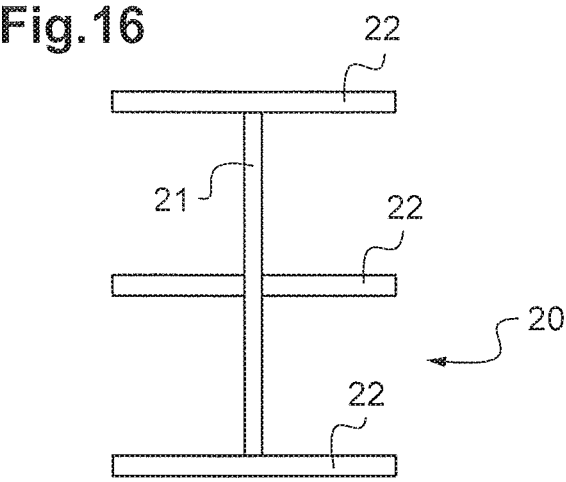
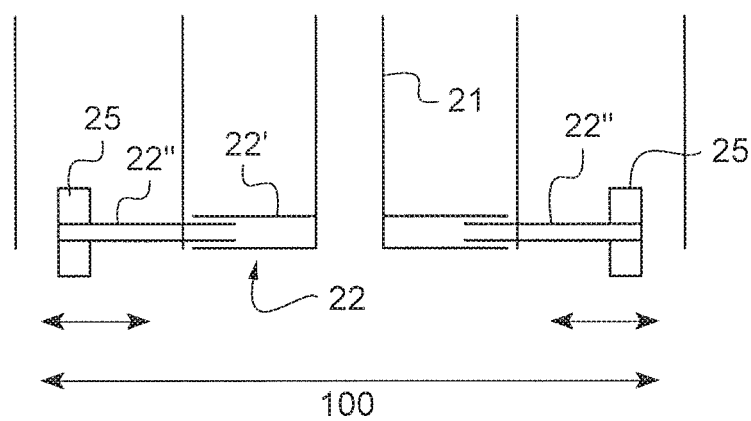

ADAPTIVELY-TWISTABLE BLADE, AND AN AIRCRAFT INCLUDING SUCH A BLADE

CROSS REFERENCE TO RELATED APPLICATION

This application claims priority to French patent application No. FR 13 02363 filed on Oct. 11, 2013, the disclosure of which is incorporated in its entirety by reference herein.

BACKGROUND OF THE INVENTION (1) Field of the Invention

The present invention relates to an adaptively-twistable blade and to an aircraft provided with such a blade, and more particularly but not exclusively to a blade for a rotorcraft lift rotor.

(2) Description of Related Art

Conventionally, a blade extends longitudinally from a first end for fastening to a rotary hub of a rotor towards a second end that is referred to as a "free" end.

The blade also extends transversely from a leading edge towards a trailing edge. The blade includes in particular an outer covering having a first skin for its suction side and referred to for convenience as its "suction side" skin, and a second skin for its pressure side and referred to for convenience as its "pressure side" skin.

A blade of a main lift rotor of a rotorcraft exerts lift during rotary motion of said main rotor, serving to support the rotorcraft in the air and possibly also to propel it. Depending on the pitch angle of the blade as controlled by a pilot or an autopilot system, the lift developed by the blade can be made greater or smaller. The aerodynamic angle of incidence of each aerodynamic profile of the blade depends on the pitch angle of the blade. An aerodynamic profile is referred to simply as "profile" for convenience.

However, starting from a threshold angle of incidence, the air stream over a given profile is observed to separate therefrom and thus from a given section of the blade. By way of example, this separation may occur at the leading edge or at the trailing edge of the profile, or indeed over the suction side of the blade at a distance lying in the range 50% to 60% along the chord of said profile from the leading edge. Such separation causes the blade to stall, i.e. gives rise to a sudden drop in its lift if the phenomenon propagates and persists over a zone lying between two profiles defining a critical surface along the span of the blade. Furthermore, separation of the air stream gives rise to turbulence, which can lead to vibration and to an increase in the drag coefficient of the blade.

Likewise, because of the different local speeds along the span of the blade, the values of lift and drag forces at any point increase ongoing from the root towards the end of a blade that is straight. This leads to non-uniform distribution of lift and drag, and to considerable moments at the root. These effects are harmful to the mechanical integrity of the blade and to the flight qualities of the rotary wing.

To limit those effects, one solution consists in twisting the blade geometrically. Twisting has the effect of limiting separation of the boundary layer over the entire span of the blade, and thus of shifting the resultant of the lift and drag forces towards the root of the blade so as to reduce the resulting movements at the root. It should be observed that the geometrical twist of a blade may be defined by the angle formed between the chord of each profile of a section of the blade relative to the reference plane of the blade. Sometimes each profile of the blade is twisted relative to the pitch variation axis of the blade through an angle measured relative to such a reference plane.

For any given blade path, it can be understood that twisting has a direct influence on the aerodynamic angle of incidence of each profile. Under such conditions, the term "twisting relationship" designates how said twist angles vary along the span of the blade.

For a given blade, the twisting relationship of that blade does not vary. The twisting relationship is the result of an acceptable compromise for optimizing the operation of the rotor over the entire flight envelope of the aircraft.

Specifically, it is found for example that a small amplitude of twist over the entire span of the blade serves to minimize the power consumed by the lift rotor of a rotorcraft in forward flight. Conversely, a large amplitude of twist over the entire span of the blade serves to minimize the power consumed by the lift rotor of a rotorcraft in hovering flight, but is penalizing during forward flight. It should be understood that a "small" amplitude is used to designate an amplitude of twist variation lying in the range 4° to 8°, for example, whereas a "large" amplitude is used to designate an amplitude lying in the range 16° to 20°, for example.

Thus, a twist amplitude lying between those small and large amplitudes represents a compromise in terms of power consumption between stages of forward flight and stages of hovering flight.

In order to avoid making such a compromise, proposals have been made to modify the twist of a blade actively, at least locally. Thus, by adapting the twist of the blade to specific flight configurations, the performance of a rotorcraft can be improved considerably in terms of transportable payload and/or cruising speed. Its environmental impact can also be reduced by lowering fuel consumption, for performance that is equivalent or even improved compared with a rotorcraft having blades of non-adaptable twist angle.

In order to twist a blade, one technique consists in deforming a structure of the blade in torsion. Such deformation may be performed with the help of an actuator delivering a drive force for twisting the blade. Such actuators may be associated with installing a blade structure made of composite materials using specific draping of fibers.

In one embodiment, a mass is moved along the chord direction at the free end of a blade in order to shift the center of gravity of the blade. Such a shift gives rise to a torsional moment on the blade about the pitch axis of the blade, for example, resulting from the combination of conical shape and centrifugal force. The mass may be moved with the help of an actuator. In addition, the torsional moment exerted on a blade section may be transmitted to another blade section via a torsion bar.

Documents US 2013/0062456, US 2012/0153073, and U.S. Pat. No. 5,505,589 describe solutions of that type.

The use of an actuator is advantageous. Nevertheless, it can be difficult to install an actuator within a blade, and in particular within a rotorcraft blade.

The space available for installing it is small, thereby putting a limit on the dimensions of the actuator that is to be used.

In addition, the actuator is subjected to high levels of mechanical stress (centrifugal force, vibration).

If an electric actuator is installed, the electric actuator also needs to be powered electrically and that can be difficult to achieve in a rotating frame of reference. Transferring electrical power from a stationary frame of reference corresponding to the airframe of the rotorcraft to a rotating frame of reference corresponding to the rotor can be constraining.

The level of difficulty encountered depends on the voltage or the current of the electricity to be transferred.

In order to power an actuator of electromechanical type having a power of a few kilowatts, a set of slip rings can be used to transfer electricity from a generator situated in the rotorcraft to an actuator situated in a blade. Requirements in terms of performance and reliability make such a set of slip rings expensive.

An actuator of piezoelectric type requires current that is low compared with an electromechanical actuator, but it requires electricity to be delivered at a much higher voltage. This constraint complicates the set of slip rings and significantly increases its costs.

The use of actuators requiring high levels of electrical power can thus give rise to problems of size and to installation costs that are high.

Unfortunately, the structure of a blade may present a relatively high degree of stiffness in torsion in order to present sound dynamic behavior. Modifying such a structure in twisting tends to require powerful actuators to be put into place.

The use of such actuators for high powers thus involves technical solutions that are complex and expensive in order to ensure that such systems operate properly with a high level of reliability.

In another embodiment, the structure of a blade made of composite material includes fibers presenting a particular orientation for the purpose of causing the blade to twist under the effect of centrifugal force. Traction exerted on those fibers by centrifugal force generates torsion of the blade. Such fibers may be arranged in the suction side and pressure side skins of the blade, or in a strip that is present within the blade, for example.

Documents US 2012/0153073, FR 2 737 465, and FR 2 956 856 describe systems making use of this principle.

Document U.S. Pat. No. 7,037,076 suggests using a shape memory alloy for causing the end of a blade to turn.

Document FR 2 374 212 discloses a blade having two spars fastened to a pitch control shaft so that a change in the pitch of the blade causes the spars to twist.

Other techniques are remote from the invention and seek to modify the profiles of the blades instead of moving them.

Thus, Documents WO 2007/079855, WO 2004/069651, US 2006/0038058, and EP 1 144 248 propose modifying the profiles of sections of a blade with the help of piezoelectric actuators. Such deformation is sometimes referred to as "morphing".

Documents FR 2 924 681, U.S. Pat. No. 5,004,189, US 2008/0145220, and U.S. Pat. No. 7,677,868 make use of electromechanical actuators.

Document U.S. Pat. No. 7,837,144 provides for a pneumatic actuator.

Documents WO 2010/043645, WO 2010/023286, WO 2010/023278, and WO 2009/056136 relate to the remote field of wind turbine blades.

BRIEF SUMMARY OF THE INVENTION

An object of the present invention is to thus to propose an adaptively-twistable blade.

According to the invention, an adaptively-twistable rotor blade is provided with a lift element having an outer covering extending spanwise in a longitudinal direction from a first end zone to a second end zone, and transversely from a leading edge to a trailing edge, the outer covering defining an internal cavity.

The blade includes at least one adaptive twister system provided with:

a carriage arranged in the cavity, the carriage having a torsion bar extending along said longitudinal direction and at least two arms that are secured to the torsion bar and that extend transversely on either side of the torsion bar, the carriage being movable in translation in the cavity along said longitudinal direction;

a connection on each arm for connecting said carriage to the outer covering, each connection including a segment of the blade including an upstream guide gallery arranged in the cavity between the leading edge of the blade and the torsion bar and a downstream guide gallery arranged in the cavity between the trailing edge of the blade and the torsion bar, each arm extending transversely from an upstream end that slides in an upstream guide gallery to a downstream end that slides in a downstream guide gallery; and at least one of said connections being a helical connection including an upstream guide gallery and a downstream guide gallery for a segment referred to as a "twister" segment that presents distinct orientations, imparting movement in rotation to this "twister" segment under the effect of the carriage moving in translation.

Each connection thus has two guide galleries, an upstream gallery and a downstream gallery, that are arranged in the same segment of the blade.

A helical connection thus has an upstream guide gallery and a downstream guide gallery that are not mutually parallel. Conversely, a connection having an upstream guide gallery parallel to a downstream guide gallery serves to obtain a slideway connection.

The terms "upstream" and "downstream" refer to the direction of air flow around the blade, which air flows from the leading edge towards the trailing edge of the blade.

The invention thus proposes a twister system having a carriage. The carriage generates a force substantially normal to the surfaces of the guide galleries at each of the ends of the arms while it is moving in translation. The combination of these forces generates a twisting or untwisting torque on the blade by movements in rotation of its ends between the segments having guide galleries extending in the travel direction of the carriage. In the text below, the term "twist" is used for convenience to cover both twisting and untwisting so as to make the text easier to read.

When the carriage moves along the span of the blade, the movement of one arm of the carriage within guide galleries having slopes gives rise to torsion of the torsion bar, and also torsion of the twister segment carrying the guide galleries. Each helical connection thus leads to movement in rotation of the corresponding twister segment. This movement in rotation gives rise to torsion of the blade, which means that the blade becomes twisted between the ends of the torsion bar.

The torsion stiffness of the torsion bar may optionally be selected so as to be as great as possible, and ideally it should tend towards being infinitely rigid. Thus, the deformation of the torsion bar as a result of the carriage moving in translation is minimized, whereas on the contrary the movement in rotation of the twister segments of the blade is maximized.

As a result of a movement of the carriage, this gives rise to adaptive twisting of the blade, and in particular of the outer covering between the segments having guide galleries.

The pitch of each helical connection, and thus the orientation of the guide galleries of the twister segments, is also selected so as to maximize the torque exerted on the outer covering. Under such circumstances, a small force exerted on the carriage to cause it to move in translation can suffice to generate torque that is suitable for twisting a conventional blade.

Astonishingly, the movement required of the torsion bar in the span direction nevertheless remains limited in order to generate the desired twisting. The twister system therefore has limited impact on the static and dynamic balancing of the blade.

Given the mass of the carriage and the speed of rotation of the blade in use, the carriage can be moved under the effect of centrifugal force. This centrifugal force gives rise to an axial force on the carriage causing it to move in translation.

In a variant, the carriage may include a device of variable mass in order to vary the magnitude of the centrifugal force exerted on the carriage.

Such a carriage may include a pouch constrained to move in translation with the carriage. The pouch is connected to a hydraulic system suitable for injecting liquid into the pouch or for extracting liquid from the pouch. The volume of liquid contained in the pouch at each instant then determines the value of the centrifugal force, and consequently the position of the carriage in the blade.

As a variant, or in addition, it is explained below that an actuator may be used for moving the carriage, in order to obtain the desired twisting.

The actuator may be controlled electrically. By using a large amount of force-amplifying mechanical advantage between the actuator and a carriage it is possible to use an actuator of low electrical power for moving the carriage, thus making it possible to avoid encountering problems that are inherent to certain prior art configurations.

An actuator may be used in addition to centrifugal force for the purpose of moving the carriage in the same direction as centrifugal force, or to generate an opposite force for moving the carriage in the opposite direction to said centrifugal force.

In summary, the twister system thus presents the advantage of requiring only a small amount of energy in order to move the carriage in translation for the purpose of creating the large amount of torque needed for twisting the blade. Centrifugal force and/or a low-power actuator can suffice for generating a large force for movement in translation. This force for movement in translation is transmitted by the torsion bar to twister segments via their guide galleries in order to enable the blade to be twisted using relatively large levels of torque.

Such an actuator can then be arranged within a blade, thereby minimizing drawbacks associated with the powerful actuators that are usually used.

When an actuator is used, the actuator may be located close to the root of the blade in order to limit unwanted effects associated with centrifugal force. Control over twisting can then be made accurate and easily modifiable in both longitudinal directions of the blade.

Furthermore, the twister system can be blocked for a given amount of twist with the help of a system that uses little or no energy, such as a nut that can be blocked by electromechanical means. The use of an irreversible helical connection makes it possible to block the system without any outside action.

In the direction going from the blade root towards the free end of the blade, centrifugal force significantly reduces the force that needs to be delivered by an actuator, if one is present. Very little energy needs to be delivered in this configuration by the actuator, since the movement of the carriage is ensured in part by centrifugal force. The actuator is then useful in particular for allowing and authorizing the torsion bar to move in controlled manner.

Returning the torsion bar towards the root of the blade, by means of the actuator, is also made easier by means of the resilient return that is naturally exerted by the blade.

Furthermore, the twister system may be arranged in a conventional blade.

In addition, the torsion bar serves to increase the torsional stiffness of the blade in those portions of the blade that have the carriage. Under such circumstances, the torsional stiffness of the blade itself and of the outer covering on the blade in those portions can be reduced compared with a conventional blade. Such a reduction in stiffness makes the blade easier to twist, without modifying the dynamic behavior of the blade.

The blade may also include one or more of the following characteristics.

For example, said torsion bar extends along a geometrical twist line of the blade. The torsion centers of the sections of the blade are then present on this geometrical twist line.

In addition, at least one arm may extend symmetrically on either side of the torsion bar, at least one arm being perpendicular to the torsion bar.

Nevertheless, the arms do not necessarily extend symmetrically on either side of the torsion bar.

Furthermore, at least one arm may be perpendicular to the torsion bar.

However, an arm is not necessarily perpendicular to the torsion bar, in particular if the arm is not rectilinear, e.g. if the arm is made up of two short arms on either side of the bar. In contrast, the straight line defined by the two points where forces are applied by the arms against the upstream and downstream guide galleries should advantageously be perpendicular to the axis of the torsion bar.

Furthermore, at least one segment may include an upstream guide gallery arranged against the leading edge of the blade and a downstream guide gallery arranged against the trailing edge of the blade.

The length of the arms sliding in this segment is then maximized, thereby maximizing the torque exerted by the carriage on the outer covering in the volume of the cavity in the blade.

In other variants, the upstream guide gallery and the downstream guide gallery of a segment may be spaced apart to a greater or lesser extent from the leading edge and the trailing edge in order to optimize centering of the system.

In addition, the orientations of the guide galleries of the twister segments may be modulated as a function of objectives in terms of twisting and of carriage stroke, amongst others.

Under such circumstances, at least one guide gallery may include a plurality of inclined planes.

In addition, or as an alternative, at least one guide gallery includes a curved slope.

Furthermore, and in order to optimize movement of the carriage in translation, at least one end of an arm may include running means facilitating sliding of the arm in the corresponding guide gallery. The running means may comprise a wheel, a ball- or roller-bearing, or indeed a smooth bearing, for example.

In a version, the carriage includes at least two arms co-operating with guide galleries by moving in rotation in opposite directions. The system then has two helical connections. The twister system can then generate movement in rotation of two distinct segments of the blade in opposite directions in order to twist the blade between said segments.

In another version, the guide galleries of a segment may be plane in order to provide a slideway connection. Thus, the twister system may generate movement in rotation of one portion of the blade while keeping another portion of the blade in a given position, in order to twist the blade between two segments fitted with guide galleries.

In order to encourage twisting of the covering, each of the segments of the blade having guide galleries comprises a frame defining an upstream guide gallery and a downstream guide gallery together with an orifice allowing the carriage to move in translation through the segment, the frame being covered by said outer covering.

The carriage then exerts a force on the frame which twists the outer covering.

Optionally, the carriage may include at least three arms. This characteristic makes it possible to adapt the twisting of the blade more accurately to different spans of the blade, for a given movement of the torsion bar.

The blade may include at least two twister systems. A blade may have a plurality of such twister systems along its span in order to adapt its twisting more accurately.

Furthermore, the twister system may include an actuator connected to the carriage for moving the carriage in translation in at least two directions, the actuator being arranged in the cavity.

The actuator may comprise a motor and a wormscrew co-operating with a nut. For example, the motor may drive rotation of a nut engaged on a fine wormscrew secured to the carriage. The inverse configuration is also possible.

Furthermore, the twister system may include a force-amplifying mechanical advantage device interposed between the actuator and the carriage in order to minimize the forces that need to be generated by the actuator.

In a version, the mechanical advantage device comprises a hydraulic member having a main piston of large area in hydraulic communication with a plurality of intermediate pistons of small area, the main piston being constrained to move in translation with said carriage, each intermediate system being controlled by an actuator.

This version amplifies considerably the force to be exerted on each intermediate piston in order to cause the main system, and thus the carriage, to move. Twisting of the blade is thus under the control of hydraulic means. The forces exerted on the intermediate pistons may be obtained by using electric actuators or by using variable masses, for example.

By way of example, the actuator may generate a force in the direction for opposing the centrifugal force exerted on the carriage.

In another version, the mechanical advantage device comprises an elongate tie connected to the carriage and to an actuator, the tie forming a loop around at least two pulleys.

The carriage is connected at one of the ends of the tie, with an actuator such as an electric actuator or a variable mass being fastened to the other end of the tie. The pulleys constitute a block-and-tackle system enabling the force that is exerted for moving the carriage to be amplified considerably.

Under such circumstances, the carriage may be moved in one direction by centrifugal force acting on the carriage, and in another direction by the actuator.

In another version, the mechanical advantage device comprises a cam connected to an actuator and to the carriage. The cam system makes it possible to exert very large forces in translation, starting from relatively little torque. This version may make use of actuators of electromechanical type.

In addition, it should be observed that such mechanical advantage devices may be actuated on the ground, using an actuator that is not present in the blade. An operator on the ground can thus adjust the twisting of a blade as a function of the profile of a mission that is to be undertaken.

In another embodiment, the blade includes an actuator located outside the lift element and connected to the carriage by a tie.

Under such circumstances, the torsion bar is connected at its end to a cable that extends from the root of the blade and that is engaged in the rotor mast where provision can be made for it to be connected to an actuator. The assembly can be in the form of a linkage. Control (e.g. hydraulic control) over the vertical movement of the rod of the actuator along the rotor mast serves to control twisting of all of the blades in a manner that is simultaneous and uniform. In this solution, the movement of a carriage towards the end of a blade is driven solely by the action of centrifugal force.

Furthermore, at least one arm may include means for setting its length. For example, each arm is provided with a movable body and two non-movable bodies that slide relative to the movable body, under the action of a fluid or of a motor, for example.

This variant consists in varying the length of the arms in order to modulate the torque applied to the outer covering. It is thus possible to control the twisting of the blade by controlling the arms.

For example, the arm may be extended in order to apply torque to the blade and twist it. In order to untwist it, the length of the arms is shortened so as to reduce the torque that is applied to the outer covering, this outer covering then untwisting because of the resilient return of the blade.

In addition to a blade, the invention provides an aircraft having a rotor. The rotor includes at least one blade of the above-described type.

The aircraft may also include a system for setting the speed of rotation of the rotor in order to adjust the centrifugal force applied to each carriage.

By varying the speed of rotation of the rotor, an operator can increase or decrease the centrifugal force exerted on the carriage. This variation in centrifugal force gives rise to a modification in the position of the carriage within the blade, and thus to an adaptable modification of the twisting of the blade, at least between the segments that co-operate with the carriage.

The aircraft may optionally include a system for blocking the carriage in position in order to maintain the twisting of the blade at a desired value independently of the speed of rotation of the rotor. By way of example, the blocking system may comprise a nut that is blocked by electromagnetic means, and that is engaged on a screw thread of the torsion bar, or indeed it may comprise an irreversible worm-screw-and-nut system.

BRIEF DESCRIPTION OF THE SEVERAL VIEWS OF THE DRAWINGS

The invention and its advantages appear in greater detail from the following description of embodiments given by way of illustration with reference to the accompanying figures, in which:

FIG. 8 is an exploded view of the system showing in particular a frame of a twister segment of the blade;

FIGS. 9 to 13 show various embodiments of an actuator co-operating with a carriage;

FIGS. 14 to 15 show various versions of guide galleries;

FIG. 16 is a view of a carriage having at least three arms;

FIG. 17 is a diagram showing an arm of variable length; and

DETAILED DESCRIPTION OF THE INVENTION

Elements that are shown in more than one of the figures are given the same references in each of them.

It should be observed that three mutually orthogonal directions X, Y, and Z are shown in some of the figures.

The first direction X is said to be longitudinal. The term "longitudinal" relates to any direction parallel to the first direction X.

The second direction Y is said to be transverse. The term "transverse" relates to any direction parallel to the second direction Y.

Finally, the third direction Z is said to be in elevation. The expression "in elevation" relates to any direction parallel to the third direction Z.

Figure 1:
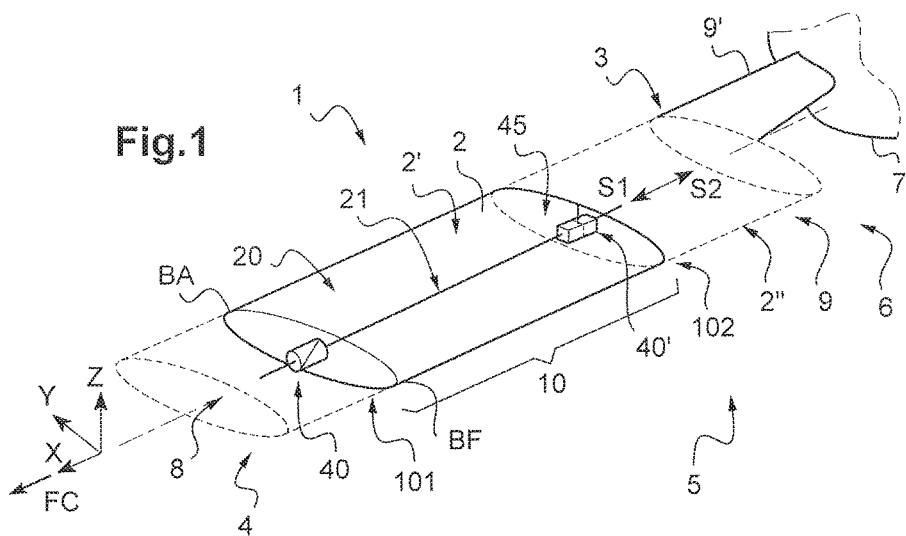
FIGS. 1 and 2 are views of an aircraft having a blade shown diagrammatically for explaining the operation of the invention.

FIG. 1 is a diagrammatic view of an aircraft 5. This aircraft 5 includes a rotor 6 having a plurality of blades. In order to avoid pointlessly overcrowding FIG. 1, only one blade 1 of the invention is shown.

The blade 1 includes a lift element 9. The lift element 9 extends along a longitudinal direction X from a first end zone 3 secured to a root 9' that is movable relative to a hub 7 of the rotor 6, towards a second end zone 4. The lift element 9 also extends in an elevation direction from a pressure side towards a suction side, and in a transverse direction from a leading edge BA towards a trailing edge BF.

The lift element has an outer covering 2 defining the pressure side and the suction side. This outer covering 2 thus has a suction side skin 2' and a pressure side skin 2" that together define a cavity 8 inside the outer covering 2.

The inside volume of the outer covering 2 is thus hollow, at least in part.

The blade 1 is also provided with at least one twister system 10 for twisting the blade between two segments 101 and 102 of the blade 1 by exerting torque on the outer covering 2 over these two segments 101 and 102.

The twister system 10 is provided with a carriage 20 that is arranged inside the cavity 8 of the outer covering 2. The carriage is provided in particular with a torsion bar 21 extending along the longitudinal direction X, e.g. along a geometrical twist line AX of the blade 1. The carriage can also be named "slider" or "chariot" in French language.

The carriage is connected to the outer covering 2 by at least two connections including at least one helical connection 40. One such helical connection connects the carriage to one of the segments 101 of the blade 1 that is referred to as the "twister segment".

The carriage can thus be connected to the outer covering 2 by at least two helical connections, or via at least one helical connection 40 and a slideway connection 40' in the example of FIG. 1.

Under such circumstances, the carriage is movable in translation along first and second opposite directions S1 and S2 within the cavity 8. The carriage may be moved in translation under the effect of the centrifugal force FC that is applied to the carriage during rotation of the blade 1. As centrifugal force increases, the carriage moves in the first direction S1 away from the hub 7. Conversely, as centrifugal force decreases (such that it is opposed by the resilient return of the blade) the carriage moves in the second direction S2 towards the hub 7.

For this purpose, the aircraft 5 may have a system for setting the speed of rotation of the rotor 6 in order to set/adjust the centrifugal force FC applied to each carriage 20.

The carriage may also present mass that is adjustable in order to adjust the value of the centrifugal force that is applied to the carriage. Thus, the position of the carriage varies as a function of its mass at each instant, where this mass is adjustable.

In addition or as an alternative, the carriage may move in the cavity 8 in at least one of the directions S1, S2 under drive from an actuator. For example, the actuator may move the carriage in both directions S1 and S2. In another alternative, the actuator comprises return means serving to move the carriage in the second direction S2 only, with the carriage being moved in the first direction S1 under the effect of centrifugal force.

Such an actuator may be an electromechanical actuator.

The actuator may also present mass that is adjustable in order to adjust the value of the centrifugal force applied to the actuator. Thus, the positions of the actuator in the blade and consequently of the carriage vary as a function of the mass of the actuator at each instant, where this mass is adjustable.

Figure 2:
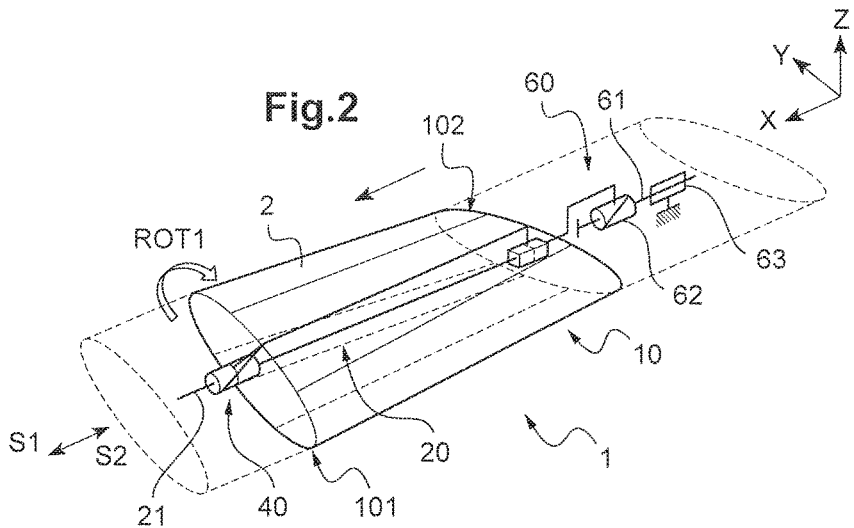

With reference to FIG. 2, an actuator 60 may comprise a motor 63 for driving rotation of a wormscrew 61, the wormscrew 61 causing a nut 62 that is secured to the carriage 20 to move in translation.

Movement in translation of the carriage 20 imparts movement in rotation ROT1 to each twister segment via a helical connection. This movement in rotation ROT1 causes torque to be created that twists the outer covering 2 between the two segments 101 and 102.

Figure 3:
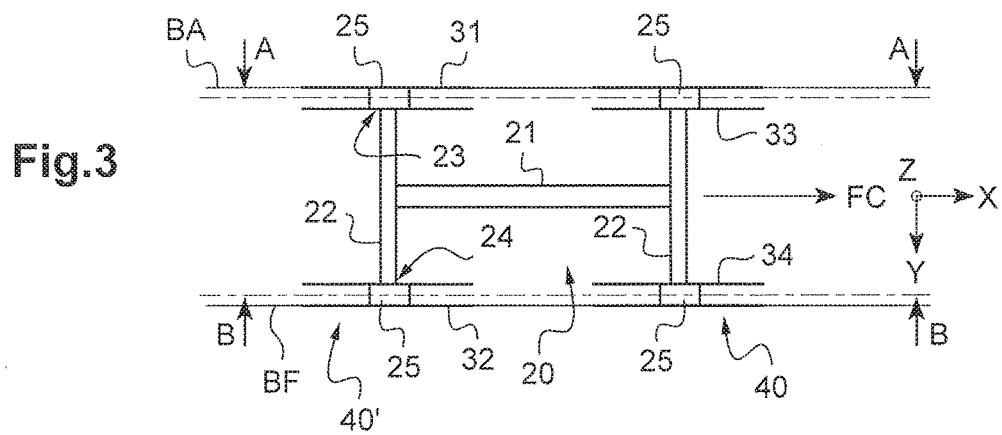
FIG. 3 is a plan view showing a carriage sliding in guide galleries.

With reference to FIG. 3, the carriage has at least two arms 22 that are secured to the torsion bar 21. At least one arm extends transversely, and possibly symmetrically, on either side of the torsion bar 21.

At least one arm 22 may also extend perpendicularly to the torsion bar so as to form a T-shaped structure. A carriage with two arms 22 may thus be H-shaped.

With reference to FIG. 16, the carriage may nevertheless include at least three arms.

In accordance with the teaching of FIG. 3, each arm 22 may extend from an upstream end 23 towards a second end 24 that is downstream. Each end may carry running means 25. Such running means may comprise at least one wheel, at least one ball-bearing or roller-bearing, or at least one smooth bearing, for example.

Under such circumstances, each connection of the carriage 20 to the outer covering 2 includes for each arm:

an upstream guide gallery 31, 33 arranged in the cavity 8 between the leading edge BA of the blade 1 and the torsion bar 21; and a downstream guide gallery 32, 34 arranged in the cavity 8 between the trailing edge BF of the blade 1 and the torsion bar 21.

The upstream end 23 of each arm thus slides in an upstream guide gallery 31, 33, and the downstream end 34 of each arm slides in a downstream guide gallery 32, 34.

At least one segment includes an upstream guide gallery 31, 33 arranged against the leading edge BA of the blade 1 and a downstream guide gallery 32, 34 arranged against the trailing edge BF of the blade 1 in order to maximize the length of the corresponding arm 22.

Figure 4:
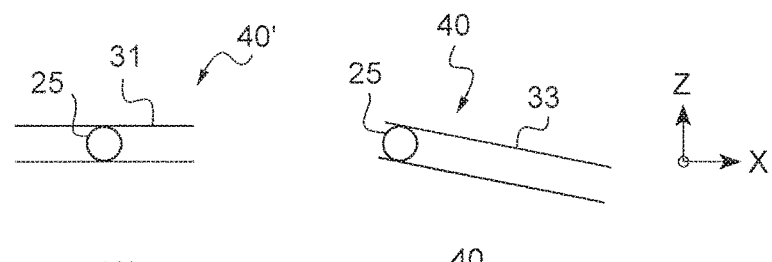
FIGS. 4-5 and 6-7 are sections in side view showing a carriage sliding respectively in upstream and downstream guide galleries.
Figure 5:
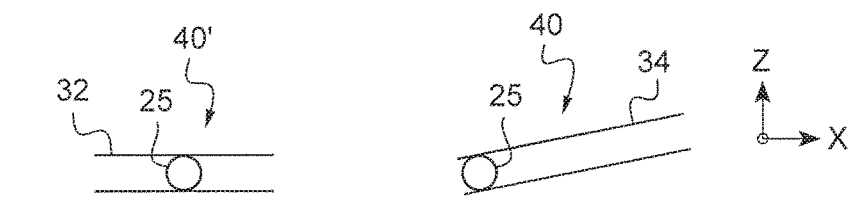

FIGS. 4 and 5 show respectively the upstream guide galleries 31 and 33 and downstream guide galleries 32, 34 at two distinct segments of the blade.

As can be seen in FIGS. 4 and 5, the twister system 10 is provided with a helical connection 40 and with a slideway connection 40'.

Under such circumstances, the upstream and downstream guide galleries 31 and 32 of the slideway connection 40' are plane and parallel to each other.

Conversely, the upstream and downstream guide galleries 33 and 34 of the helical connection 40 present different orientations and they are therefore not parallel to each other.

Moving an arm in translation in these upstream and downstream guide galleries 33 and 34 of the helical connection 40 generates torsion in the torsion bar 21, and movement in rotation of the blade segment connected to these upstream and downstream guide galleries 33 and 34 of the helical connection 40. This results in torsion of the outer covering 2 between the helical connection 40 and the slideway connection 40'.

Figure 6:
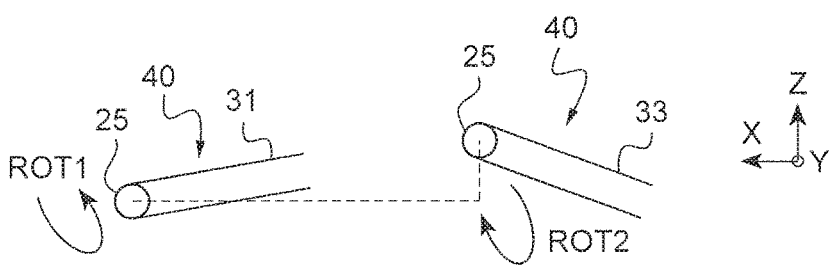
Figure 7:
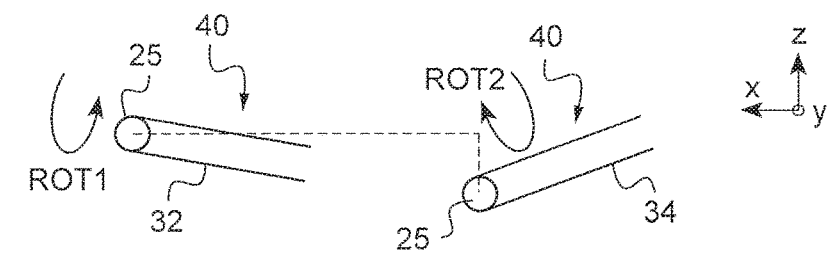

In FIGS. 6 and 7, the twister system may comprise two helical connections 40 that present pitches that are different, or indeed opposite.

When the pitches are opposite, as shown in FIGS. 6 and 7, the carriage 20 has two arms 22 that move in rotation in opposite directions ROT1 and ROT2 as they move in translation along the guide galleries.

With reference to FIG. 14, at least one guide gallery 32, 34 of a helical connection comprises a plurality of inclined planes 35, 36.

In FIG. 15, at least one guide gallery 32, 34 of a helical connection presents a curved slope 37.

FIG. 8 shows a portion of a lift element extending between two segments 101, 102 fitted with guide galleries co-operating with a carriage 20. The term "segment" is used herein to designate a part of the blade extending in the span direction and fitted with upstream and downstream guide galleries. The term "portion" is used to designate a part of the blade extending in the span direction from one segment to another segment.

The segments 101, 102 may comprise respective rigid frames 50 that are shown in particular in the detail views Z1 and Z2 of FIG. 8. Such a frame is a rigid frame secured to the outer covering 2.

Under such circumstances, each frame presents an upstream guide gallery 33 and a downstream guide gallery 34 together with an orifice 51 enabling the carriage 20 to move in translation through the frame.

Consequently, when the carriage moves in translation, the arms of the carriage slide in the guide galleries. At twister segments provided with guide galleries that are not mutually parallel, an arm also moves in rotation. This movement in rotation thus gives rise to movement in translation of the frame in which the arm is sliding, and consequently to twisting of the blade.

Furthermore, the twister system may include an electromechanical actuator or a mass that is variable, e.g. for causing the carriage to move in at least one direction.

Such an actuator 60 may be arranged outside the lift element of a blade, as shown in the embodiment of FIG. 9.

For example, the actuator 60 may be connected to at least one carriage 20 by a filamentary tie 81. The actuator 60 may then be a jack arranged in the mast 82 that drives rotation of the hub 7 of the rotor 6.

The actuator may possibly control all of the carriages of all of the blades of the rotor 6 simultaneously in order to make the twisting of the blades uniform.

An actuator may also be arranged in the cavity 8 of a blade. In order to optimize the characteristics of such an actuator and make it as compact as possible, the twister system may then include a force-amplifying mechanical advantage device interposed between the carriage and the actuator.

FIGS. 10 to 13 show various mechanical advantage devices 70.

FIGS. 10 and 11 disclose a first mechanical advantage device.

This mechanical advantage device 70 includes an elongate tie 75 connected to the carriage 20 and to an actuator 60. The mechanical advantage device 70 also includes at least pulleys 76, the tie 75 being looped around the two pulleys 76.

The carriage and the actuator can then be arranged one above the other.

Although FIGS. 10 and 11 show an electromechanical actuator, other types of actuator can be envisaged.

FIG. 12 discloses a second mechanical advantage device 70 that is of hydraulic type.

The mechanical advantage device 70 includes a casing 71 defining a hydraulic chamber 71 that is filled with an incompressible fluid 72.

The mechanical advantage device 70 also includes a main piston 73 and at least two intermediate pistons sliding in the casing and in contact with the incompressible fluid. Each intermediate piston possesses a small area, i.e. a small area of contact with the incompressible fluid. Conversely, the main system possesses a large area, i.e. a large area of contact with the incompressible fluid, which area is greater than said small area.

Each intermediate piston is then caused to move by an actuator, which actuator may control all of the intermediate pistons, for example.

FIG. 13 shows a third mechanical advantage device 70 using a cam.

Thus, the mechanical advantage device 70 may comprise a pinion 78 that is rotated by an actuator. The pinion then meshes with a rack connected to a carriage 20.

FIG. 17 shows an arm having means for setting its length 100. This length 100 is the distance between the ends of the arm sliding in the guide galleries.

For example, the arm comprises a fixed-length portion 22' and two movable portions 22" each carrying respective running means 25. The length 100 of the arm is thus variable.

By way of example, the arm may include conventional hydraulic, pneumatic, or electrical means for moving the movable portions relative to the fixed-length portion.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

Figure 18:
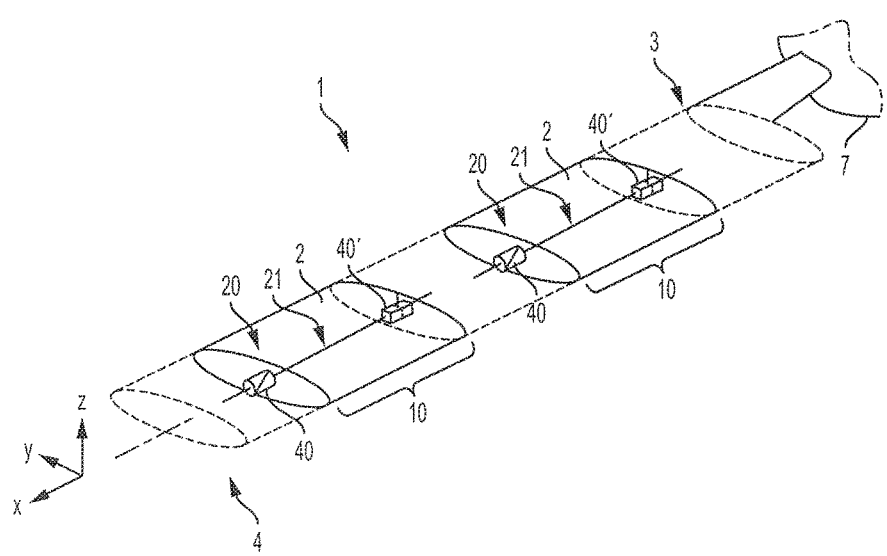
FIG. 18 is a view of a blade shown diagrammatically with two adaptive twister systems.

For example, the blades shown have only one twister system. Nevertheless, a blade could have a plurality of portions, each provided with a respective twister system. For example, as shown in FIG. 18, the blade 1 may include at least two adaptive twister systems 10. A blade may have a plurality of such twister systems 10 along its span in order to adapt its twisting more accurately.

Likewise, the figures show rectilinear arms extending perpendicularly to a torsion bar. Nevertheless, each arm may for example be V-shaped, with the ends of the arm nevertheless lying on a geometrical line extending perpendicularly to the torsion bar.

What is claimed is:

1. An adaptively-twistable rotor blade provided with a lift element having an outer covering extending spanwise in a longitudinal direction from a first end zone to a second end zone, and transversely from a leading edge to a trailing edge, the outer covering defining an internal cavity, wherein said blade includes at least one adaptive twister system provided with:
   a carriage arranged in said cavity, said carriage having a torsion bar extending along said longitudinal direction and at least two arms that are secured to the torsion bar and that extend transversely on either side of the torsion bar, said carriage being movable in translation in said cavity along said longitudinal direction;
   a connection on each arm for connecting said carriage to the outer covering, each connection including a segment including an upstream guide gallery arranged in the cavity between the leading edge of the blade and the torsion bar and a downstream guide gallery arranged in the cavity between the trailing edge of the blade and the torsion bar, each arm extending transversely from an upstream end that slides in an upstream guide gallery to a downstream end that slides in a downstream guide gallery; and
   at least one of said connections being a helical connection such that the segment associated therewith is a twister segment and the upstream guide gallery and the downstream guide gallery for the twister segment present distinct orientations, and impart movement in rotation to the twister segment under the effect of the carriage moving in translation.

2. A blade according to claim 1, wherein said torsion bar extends along a geometrical twist line of the blade.

3. A blade according to claim 1, wherein at least one arm of the at least two arms extends symmetrically on either side of the torsion bar and is perpendicular to the torsion bar.

4. A blade according to claim 1, wherein, for at least one of the segments, the upstream guide gallery associated therewith is arranged against the leading edge of the blade and the downstream guide gallery associated therewith is arranged against the trailing edge of the blade.

5. A blade according to claim 1, wherein at least one of the upstream and downstream guide galleries associated with the helical connection and the twister segment includes a plurality of inclined planes.

6. A blade according to claim 1, wherein at least one of the upstream and downstream guide galleries associated with the helical connection the twister segment includes a curved slope.

7. A blade according to claim 1, wherein at least one end of an arm of the at least two arms includes running means facilitating sliding of the arm in a corresponding guide gallery.

8. A blade according to claim 1, wherein said carriage includes the at least two arms co-operating with guide galleries by moving in rotation in opposite directions.

9. A blade according to claim 1, wherein each of said segments comprises a frame defining the upstream and downstream guide galleries associated therewith together with an orifice allowing the carriage to move in translation through the segment, said frame being covered by said outer covering.

10. A blade according to claim 1, wherein said carriage includes at least three arms.

11. A blade according to claim 1, wherein said blade includes at least two adaptive twister systems.

12. A blade according to claim 1, wherein said adaptive twister system includes an actuator connected to said carriage for moving said carriage in translation in at least one direction, said actuator being arranged in said cavity.

13. A blade according to claim 12, wherein said actuator comprises a motor and a wormscrew co-operating with a nut.

14. A blade according to claim 12, wherein said adaptive twister system includes a force-amplifying mechanical advantage device interposed between the actuator and the carriage.

15. A blade according to claim 14, wherein said mechanical advantage device comprises a hydraulic member having a main piston of large area in hydraulic communication with a plurality of intermediate pistons of small area, the main piston being constrained to move in translation with said carriage, each intermediate system being controlled by an actuator.

16. A blade according to claim 14, wherein said mechanical advantage device comprises an elongate tie connected to the carriage and to an actuator, the tie forming a loop around at least two pulleys.

17. A blade according to claim 14, wherein said mechanical advantage device comprises a cam connected to an actuator and to the carriage.

18. A blade according to claim 1, wherein the blade includes an actuator located outside the lift element and connected to the carriage by a tie.

19. A blade according to claim 1, wherein said carriage includes a device of variable mass in order to vary a centrifugal force exerted on the carriage.

20. A blade according to claim 1, wherein at least one arm of the at least two arms includes means for setting its length.

21. An aircraft having a rotor, wherein said rotor includes at least one blade according to claim 1.

22. An aircraft according to claim 21, wherein said aircraft includes a system for setting the speed of rotation of the rotor in order to set the centrifugal force applied to each carriage.

* * * * *